US010169430B2

(12) United States Patent
Fogel et al.

(10) Patent No.: US 10,169,430 B2
(45) Date of Patent: Jan. 1, 2019

(54) AGGREGATION OF SEPARATE DOMAIN DATA

(71) Applicant: BlackBerry Limited, Waterloo (CA)

(72) Inventors: Christopher Michael Fogel, Kitchener (CA); Francis Patrick Judge, Andover, MA (US); Brian Timothy Ratta, Lawrence, MA (US); Mark Justin Flanigan, Ottawa (CA); Carl Lloyd Cherry, Waterloo (CA); Andrew John Ewanchuk, Baden (CA)

(73) Assignee: BlackBerry Limited, Waterloo, Ontario (CA)

( * ) Notice: Subject to any disclaimer, the term of this patent is extended or adjusted under 35 U.S.C. 154(b) by 670 days.

(21) Appl. No.: 14/307,204

(22) Filed: Jun. 17, 2014

(65) Prior Publication Data

US 2015/0363474 A1 Dec. 17, 2015

(51) Int. Cl.
*G06F 17/30* (2006.01)
*H04W 12/08* (2009.01)

(52) U.S. Cl.
CPC .. *G06F 17/30554* (2013.01); *G06F 17/30964* (2013.01); *H04W 12/08* (2013.01)

(58) Field of Classification Search
None
See application file for complete search history.

(56) References Cited

U.S. PATENT DOCUMENTS

| 7,209,915 | B1* | 4/2007 | Taboada | G06F 17/30864 707/755 |
| 2007/0136261 | A1 | 6/2007 | Taboada et al. | |
| 2008/0281836 | A1 | 11/2008 | Dykstra-Erickson et al. | |
| 2009/0313299 | A1* | 12/2009 | Bonev | G06Q 10/109 |
| 2010/0235447 | A1 | 9/2010 | Goodman et al. | |
| 2013/0185336 | A1* | 7/2013 | Singh | G06F 17/30654 707/794 |
| 2014/0057606 | A1* | 2/2014 | Kunjithapatham | H04L 51/14 455/412.2 |

FOREIGN PATENT DOCUMENTS

| CN | 103634370 A | 3/2014 |
| EP | 2717602 A1 | 4/2014 |
| WO | 2008097934 A2 | 8/2008 |

OTHER PUBLICATIONS

Canadian Office Action; Application No. 2,894,048; dated Jun. 27, 2016; 5 pages.

(Continued)

*Primary Examiner* — Anhtai V Tran
(74) *Attorney, Agent, or Firm* — Conley Rose, P.C.; J. Robert Brown, Jr.; Joseph J. Funston, III

(57) ABSTRACT

A device may include a multiple domains for separating applications and data. A query may be generated on the device. The query may be generated by an application or based on a received user selection. A determination of available domains on the device is made for processing the query. The available domains are scanned based on the query to obtain related content from the available domains. The related content is aggregated from the available domains. The aggregated related content is presented to a user of the device as a unified view from among the available domains.

19 Claims, 6 Drawing Sheets

(56) References Cited

OTHER PUBLICATIONS

"PIM Android Architecture"; May 19, 2014; 30 pages.
European Extended Search Report; Application No. 15172388.9; dated Nov. 17, 2015; 9 pages.
Canadian Office Action; Application No. 2,894,048; dated Jun. 1, 2017; 4 pages.
Canadian Office Action; Application No. 2,894,048; dated May 4, 2018; 4 pages.
Chinese Office Action; Application No. 201510336546.9; dated Mar. 5, 2018; 16 pages.
European Examination Report; Application No. 15172388.9; dated Jul. 18, 2018; 4 pages.

* cited by examiner

AGGREGATION OF SEPARATE DOMAIN DATA

BACKGROUND

Embodiments of the disclosed subject matter generally relate to the field of electronic devices, and, more particularly, to aggregation of data from different security domains of an electronic device.

Communication and computing devices including mobile devices, such as smart phones, laptops, tablets, handheld gaming devices, as well as other devices have the capability of accessing different applications, data, and other information at one time. Frequently, these types of devices may be used for both personal and work activities. The device may utilize separate domains that may include different user accounts, applications, and network resources that are separated by security protocols. Typically, information from a first domain is not provided to a second domain because of the applicable security and separation of information between domains.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
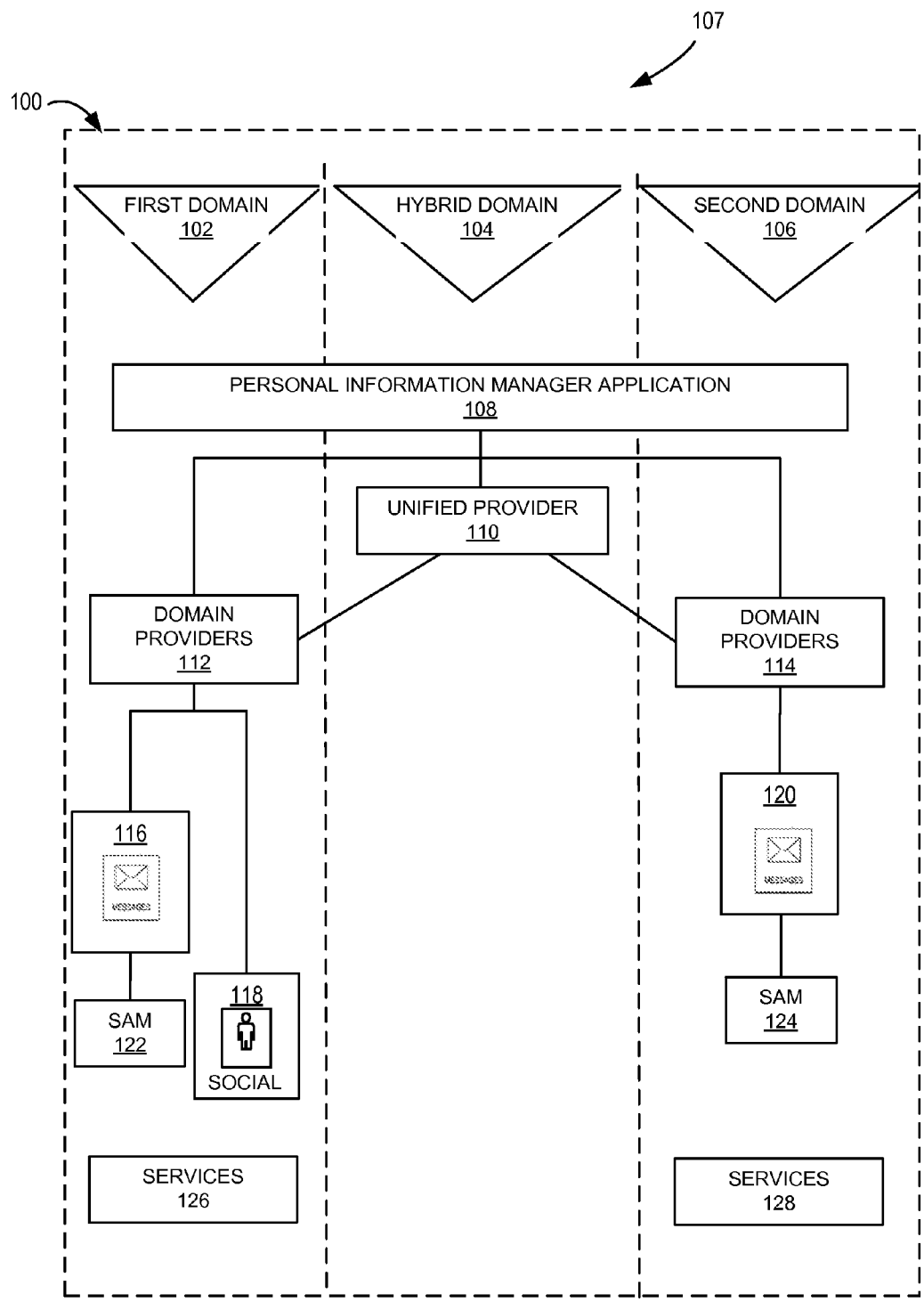
FIG. 1 is an illustration of a memory of a device for aggregating content from among multiple domains in accordance with an embodiment of the present disclosure.

The description that follows includes example systems, methods, techniques, instruction sequences and computer program products that embody techniques of the illustrate e embodiments. However, it is understood that the described embodiments may be practiced without these specific details. For instance, although examples refer to aggregating data from among domains, the various access and aggregation techniques taught by this disclosure may be applicable to other computing and communication technologies, such as perimeters, user accounts, memories, partitions or other separators. In other instances, well-known instruction instances, protocols, structures and techniques have not been shown in detail in order not to obfuscate the description.

Electronic user devices including computing and communications devices, such as tablet computers or smart-phones may be used for various types of activities including, for example, both personal and work activities and are referred to as a device or devices. To protect sensitive data, such as work data, which may be proprietary or confidential, domains may be utilized to separate and protect the data. For example, data related to personal contacts may be separated from data related to work contacts. Domains are used herein to refer to a logical collection of resources that are managed separately from another domain. For example, domains may be used to logically separate resources and information (e.g., files, applications, certificates, configuration data, network connections, data, etc.) utilized on the device based on a security policy. Each domain may include one or more policies regarding use or access of the domain resources. When operating within one domain, access to data outside of the domain may be controlled or restricted.

Domains may be implemented on computing and communication systems that include a device, and may be used to logically separate information (e.g., files, applications, certificates, configuration data, network connections, data, etc.) utilized on the device. For example, the device may include multiple domains including a first personal domain, an enterprise, business, or work domain, a second personal domain, and a shared domain. However, the number and types of domains that may be utilized across the device are not limited. The domains may prevent a user from accessing resources from different resources without authorization. For example, keeping corporate data, applications, and networks isolated from personal data, applications, and networks may be desirable for protecting valuable information, ensuring confidentiality, and for digital security.

In one embodiment, the personal domain may be managed by the user of the device and the enterprise domain may be managed by an enterprise (e.g., corporate administrator). In other embodiments, the enterprise may manage the personal domain as well as the enterprise domain. Control of the device may depend on whether the device is provided by an enterprise, employer, or corporation (i.e., corporate-liable device) or purchase, owned, or otherwise provided by the user (i.e., personal-liable device). More frequently individual users are purchasing their own devices and utilizing them for work because of the personal importance of maintaining a well-function and up-to-date device for personal and work activities. As a result, it may also be valuable to retrieve information from among the domains of the device.

Separation of file systems including the domains may be logical, physical, or both. A physical separation of file systems may be implemented utilizing separate memory locations (e.g., separate memory chips). As noted, logical separation of file systems may be implemented utilizing partitions, perimeters, namespaces, domains, or any combination thereof. User preferences may define capabilities and permissions granted to the applications executed within one or more domains as well as the security restrictions and the applications and data available through the domains. The illustrative embodiments enable cross domain querying to aggregate related content for display to a user.

In one embodiment, the illustrative embodiments provide a system, method, and device for aggregating content of domains. A query may be generated on a device. A determination may be made of available domains on the device. The available domains may be scanned to obtain related content from the available domains. The related content may be aggregated from among the available domains. The aggregated related content may be presented to the user of the device.

In another embodiment, the content includes data and applications that are aggregated for display to the user without accessing the content. The query may represent an automatic request generated by the device or a search request from the user. For example, the query may be automatically generated by an application.

FIG. 1 is an illustration of a memory 100 of a device for aggregating content from among multiple domains in accordance with an embodiment of the present disclosure. In one embodiment, the memory 100 is integrated with an electronic device. The memory 100 may include any number of domains, including, a first domain 102, a hybrid domain 104, and a second domain 106 (altogether referred to as "domains 107"). In other embodiments, the memory 100 may include any number of domains.

In one example, the first domain 102 may represent a personal domain including personal data and the second domain 106 may represent an enterprise domain containing enterprise data. The hybrid domain may include the personal and enterprise data of the first domain 102 and the second domain 106. In one embodiment, the hybrid domain 104 may not include a file system storage or networking. Instead, the hybrid domain 104 may be utilized to show unified views of data and content from all of the domains 107.

The memory 100 may also include a personal information manager (PIM) application 108. In one embodiment, the PIM application 108 may be implemented distinctly in each of the domains 107. For example, a distinct instance of the PIM application 108 may be implemented by the first domain 102, hybrid domain 104, and the second domain 106. The PIM application 108 may include a user interface and application logic for interacting with other portions of the memory 100 and associated device. In another embodiment, the PIM application 108 may be utilized across domains.

The PIM application 108 may be configured to communicate with a unified provider 110 of the hybrid domain 104. The unified provider 110 is a unit that aggregates data from among multiple domains 107 into a cross domain data set for users or applications, such as the PIM application 108 that utilize unified views. As a result, queries resulting in aggregating related content from the domains 107 may be performed from the hybrid domain 104 because of the access to the first domain 102 and the second domain 106. In other embodiments, the unified provider 110 may be utilized within any of the domains 107 or each of the domains 107 may include a unified provider 110.

In one embodiment, the unified provider 110 may determine available domains. For example, the domains 107 may change or be reconfigured. As a result, the unified provider 110 may determine the domains 107 that are to be queried before initiating the query. The available domain providers 112 and 114 may be queried Examples of utilizing the unified provider 110 includes unifying message views across the domains 107 or unifying a set of contacts available from among the domains 107. In one embodiment, the unified provider 110 receives a request or command from the PIM application 108 to perform a query. The unified provider 110 is then configured to aggregate relevant content based on the query of the domains 107. The query may be utilized to obtain relevant information from the various levels of the domain 107 to provide relevant and related data and information. In one embodiment, the unified provider 110 obtains related content and data from the domain providers 112 and 114 through a list uniform resource identifier (URI). The data aggregation performed by the unified provider 110 may occur in the memory 100 in real-time based on the query.

Figure 4:
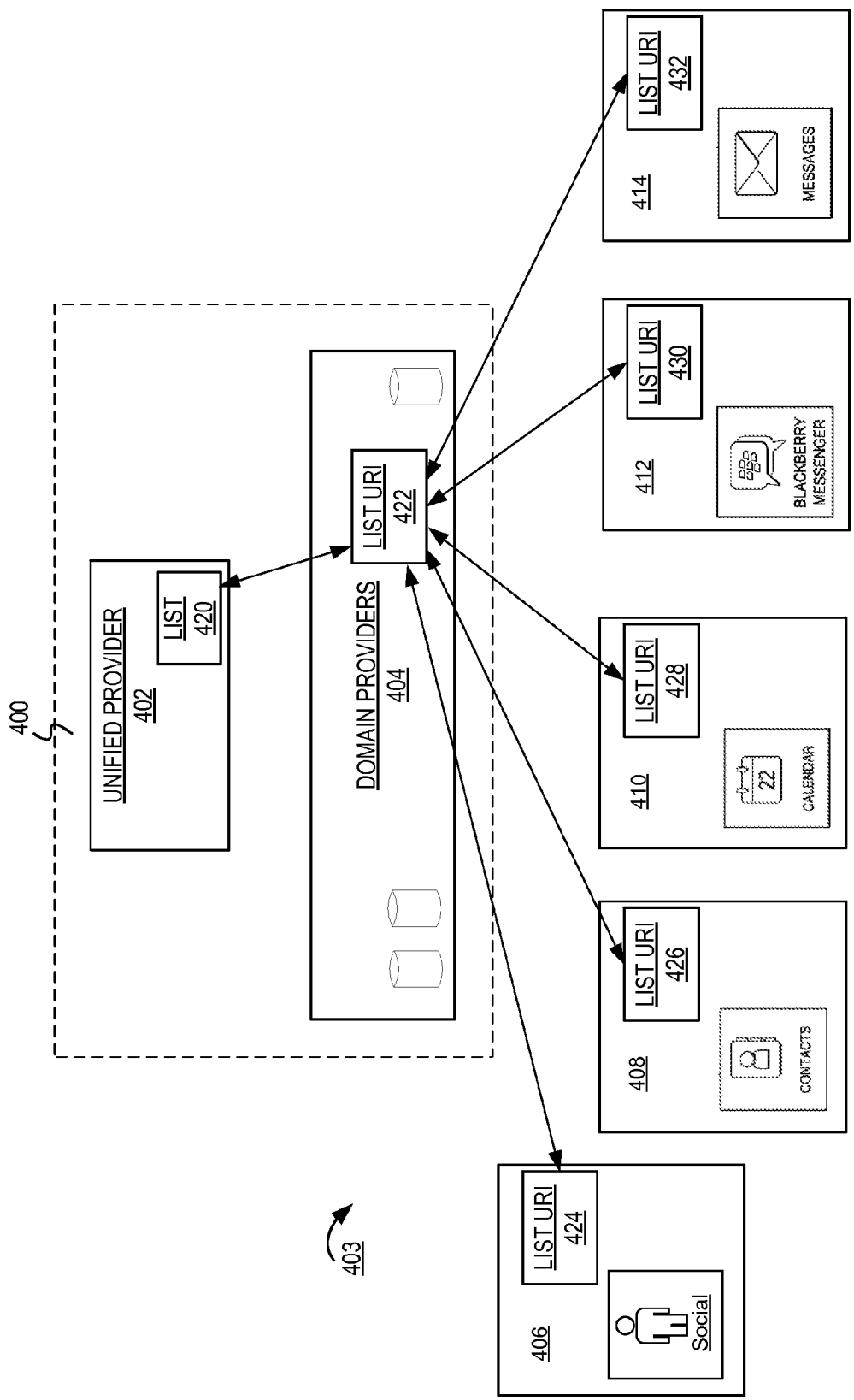
FIG. 4 is an illustration showing an example of a search across a domain in accordance with an embodiment of the present disclosure.

The PIM application 108 may control queries through one or more controlling lists as is further shown in FIG. 4. For example, the lists may define a minimal set of attributes (e.g., author, description, time stamp, state, etc.) that a content provider may map data to in response to the query. In one embodiment, namespaces may be utilized to separate the file systems, network interfaces, and inter-process communications (IPC) channels for each of the domains 107. Namespaces are containers for a set of identifiers (also known as symbols and names). Namespaces may be utilized to distinguish between identifiers with the exact same name in the memory. For example, the namespaces may be utilized to perform accurate queries of the domains 107 including applicable content providers, accounts, and so forth.

The system further includes domain providers 112 and 114. The domain providers 112, 114 may include storage for placing their data in databases. The domain providers 112 may communicate with one or more content providers, such as content providers 116 and 118. A content provider is a unit which provides data for applications, activities, components, or other units to utilize. The content providers 116, 118 may utilize a standard interface to interact with data and databases utilizing operations, such as query, insert, delete, and update.

The domain providers 114 may communicate with content provider 120. The content providers 116, 118, 120 may represent a Mime Type or account specific content provider which include the detailed attribute data corresponding to the type or category of content provider (e.g., email provider, calendars, contacts, social, etc.). The content providers 116, 118, 120 may provide summary data for a particular type of data within a domain (e.g., contact, calendar, messaging, etc.) In one embodiment, one or more of the content providers 116, 118, 120 may communicate with synchronization adapter modules (SAMs) 122, 124. The SAMs 122, 124 are units that synchronize data. For example, the SAMs 122, 124 may synchronize data between one or more network servers and a device associated with the memory 100. The SAMs 122, 124 may include synchronization logic (e.g., POP3, IMAP, SMTP, messaging, CalDAV, CardDAV, ActiveSync, call logs, social networks, contacts, SMS/MMS, desktop integration, etc.) for performing synchronization with the content providers 116, 120, respectively.

The related data found based on the query and associated scan may be maintained in the different domains 107. The query may result in multiple queries to each of the domains 107. The related data retrieved by the different queries may be brought together temporarily by the unified provider 110 for presentation to a user as a combined or unified view based on the query. In one embodiment, the related data is not stored or maintained outside the respective domain from which the related data is found.

The first domain 102 and the second domain 106 may also include services 126, 128. The services 126, 128 are units for mining and enhancing PIM data and create analytic relationships between data types used by the PIM application 108.

In another embodiment, the PIM application 108 may query the domain providers 112 directly. For example, the PIM application 108 may query the domain providers without the unified provider in a single domain deployment within the memory 100.

Figure 2:
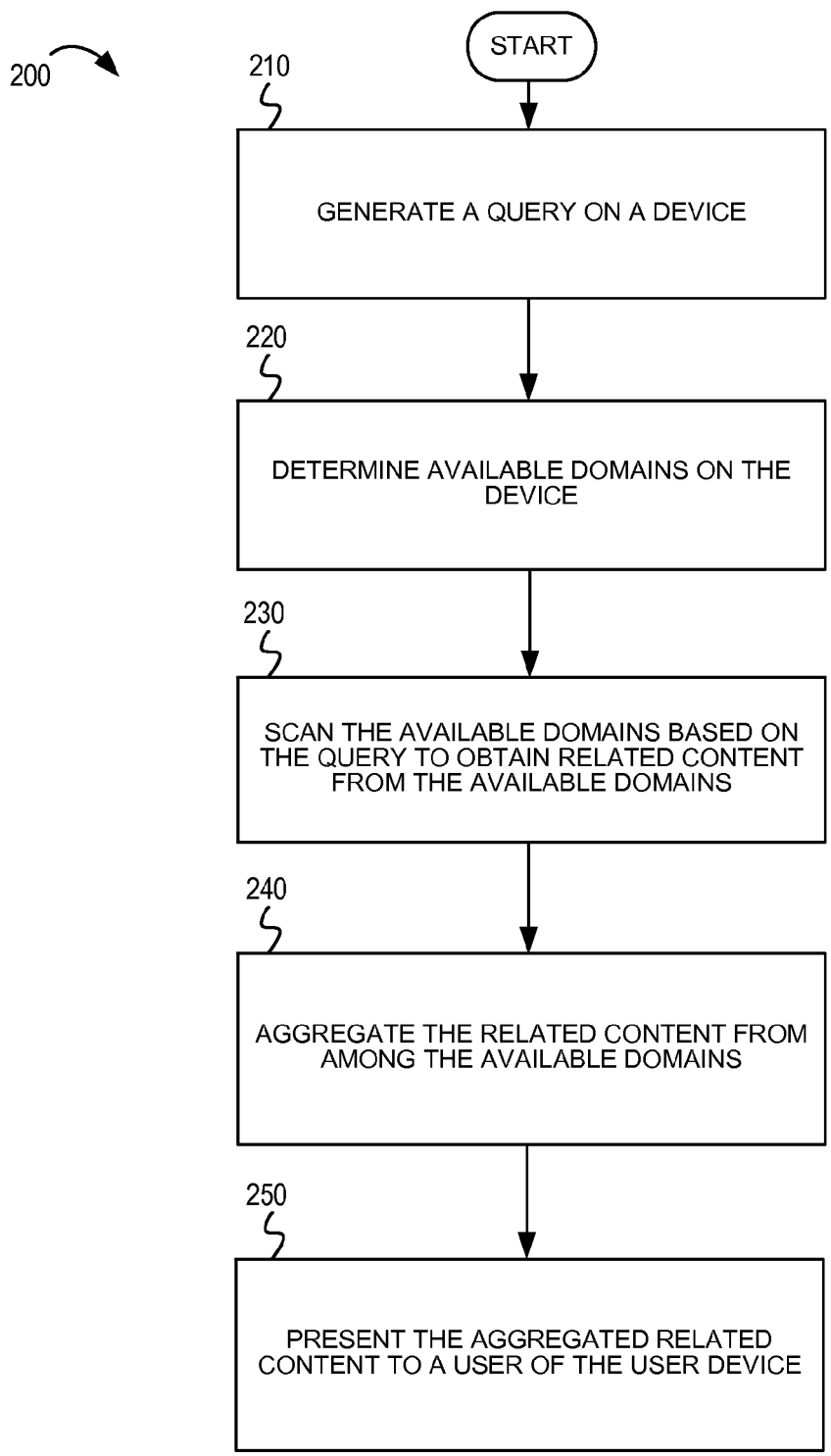
FIG. 2 is an example flowchart illustrating searching across domains in accordance with an embodiment of the present disclosure.

FIG. 2 is an example flowchart illustrating searching across domains in accordance with an embodiment of the present disclosure. Operations of the flowchart 200 may be performed by any number of devices. In one embodiment, a wireless device may implement the operations described by the flowchart 200. In some embodiments, a system including at least a device, a network, and one or more content providers may implement the operations herein described.

At 210, a device may generate a query on the device. In one embodiment, the query may be automatically generated by an application or request. In another embodiment, the query may be a search request generated based on text, audio input, or other information provided by the user. The search request may also be based on a term, phrase, or other data that the user links to or selects. For example, the user may select a term from an email in a personal email account to query the domains of the device. The query may be generated or received from any number of devices.

At 220, the device may determine available domains in the device. The domains may represent those that are configured for utilization on the device. For example, the domains may include, for example, enterprise, personal, shared, and hybrid domains. In one embodiment, the user preferences may specify domains that are searchable across the device. For example, the personal domain may be considered extremely confidential and may not even return search results across the personal domain based on the query. In one embodiment, the default may be to allow searching and aggregation of related content from among the available domains unless the user preferences are otherwise changed to prevent aggregation of the related content from among the available domains. In another embodiment, an administrator of the enterprise domain may set limits on querying the enterprise domain. The limits may include types of information (e.g., appointments, contacts, emails, etc.), availability (e.g., days of the week, time of day, etc.), and verification. In one example, a user may provide a separate password or pin to authorize a query across all of the domains of the device.

The device may also identify units that act on a data of a specific multipurpose Internet mail extension (MIME) type (e.g., email messaging, social message, contact data, etc.) There may be N number of Mime type groups in a domain, one for each type of data in the domain.

At 230, the device scans the available domains based on the query to obtain related content from the available domains. The device may utilize any number of searching algorithms or processes for querying and scanning the domains based on the information provided in the search request. In one embodiment, the user preferences may allow the user to specify which of the related content is shown first. For example, the enterprise domain may have a first priority, while a first personal domain may have a second priority, and a shared domain may have a third priority for aggregating the related content for communication to the user.

At 240, the device aggregates the related content from among the available domains. The related content may be compiled for subsequent presentation to the user. The aggregated related content may be temporarily stored in memory for quick retrieval. The aggregated related content may be deleted once presented to the user, saved temporarily, or purged at periodic time periods. In one embodiment, the aggregated related content may be read into an anonymous shared memory.

At 250, the device presents the aggregated related content to a user of the device. The aggregated related content may be presented utilizing a user interface. The user interface may include visually presenting the information. For example, an application that originally issued the query may display the aggregated related content to the user in any number of forms. In other embodiments, the aggregated related content may be played audibly or otherwise presented to the user based on user preferences (e.g., braille interface, communication to a secondary device, etc.). The results of the query may be merged for presentation to the user. As previously noted, the search results represented by the aggregated related content may be prioritized or presented based on user preferences. In one embodiment, the related content is presented without linking the user to the data. The user may retrieve applicable information, but may not be able to access, manage, or change the data in the domain without accessing or moving to the domain. As a result, existing security policies and procedures established for each of the domains are maintained.

Figure 3:
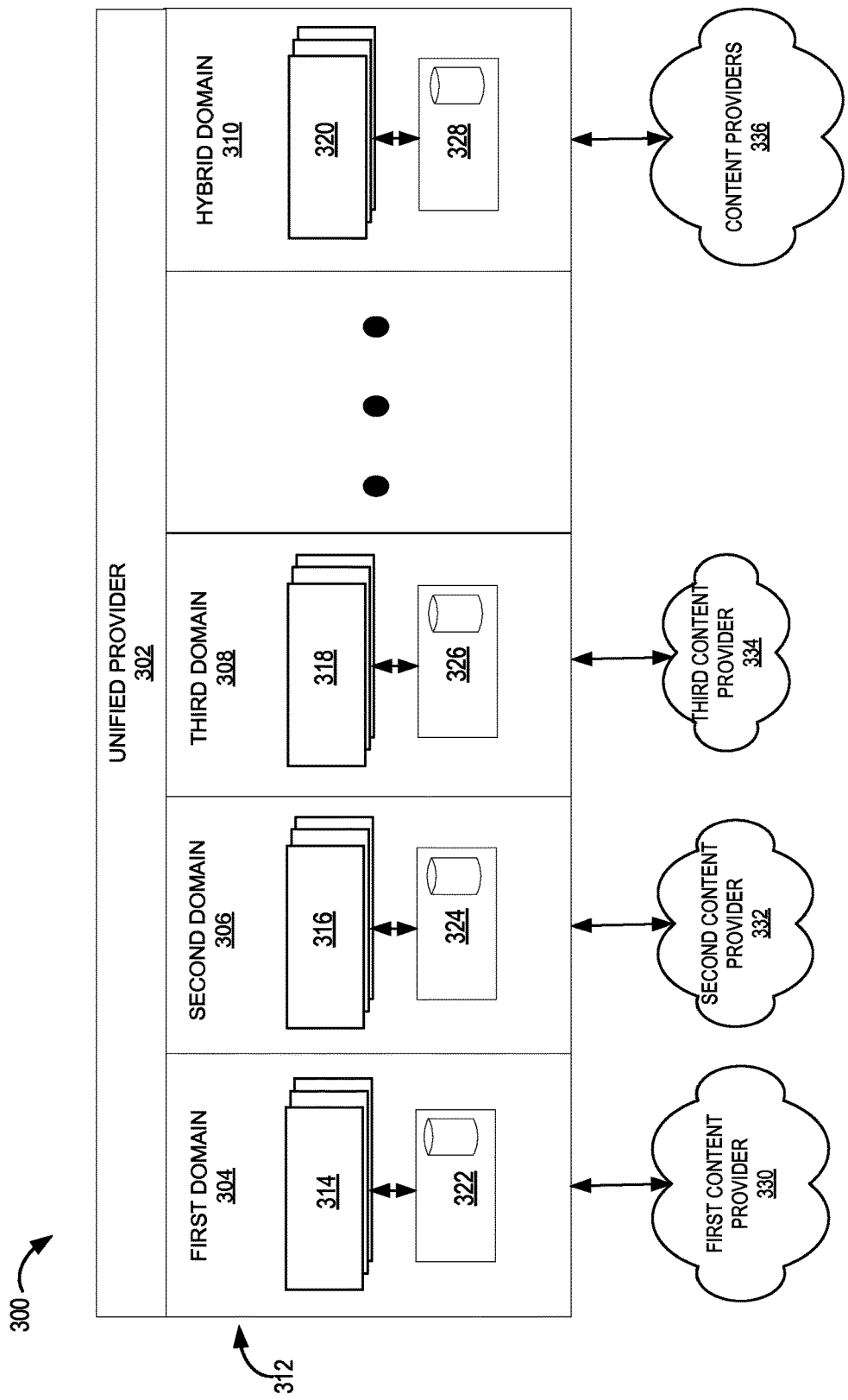
FIG. 3 is an illustration of a domain manager and domains in accordance with an embodiment of the present disclosure.

FIG. 3 shows a block diagram of a memory 300 of a device for searching across domains in accordance with an embodiment of the present disclosure. In one embodiment, the memory 300 is configured to store applications and application data, such combination of stored applications and data being referred to herein as content.

The memory 300 may include a unified provider 302 for accessing and managing multiple domains. In another embodiment, the unified provider 302 may be referred to as a domain manager. In one embodiment, the memory 300 may be divided into a first domain 304, a second domain 306, a third domain 308, and a hybrid domain 310 (altogether "the domains 312"). As illustrated in FIG. 3, the memory 300 may include n domains 312. Although the memory 300 may frequently include between two and four domains, the number of domains 312 is not limited. Utilization of an increased number of domains has become more prevalent as devices are being shared for business purposes and among family members, friends, and associates. As previously noted, the domains 312 may be identified utilizing namespaces, such as an authority string utilized to perform specific request of individual domains.

As shown the domains 312 may include applications 314, 316, 318, 320 and data 322, 324, 326, 328, respectively. The data 322, 324, 326, 328 may represent any number of databases, data stores, stored information and data, and so forth. In one embodiment, the first domain 304 may be associated with enterprise activities or an enterprise mode and may include applications 314 and data 322 segregated for the enterprise. For example, the applications 314 and the data 322 may be considered sensitive to a business, corporation, government, non-profit organization, a user of the device, or any other entity setting information technology policy for a device associated with the memory 300. Within the first domain 304, the applications 314 may communicate with the data 222. The first domain 304 may also access outside resources including enterprise resources (e.g., servers, databases, cloud networks, etc.), entities, or so forth represented by a first content provider 330. In one embodiment, the data 322 may be corporate data and may be provided to a device based on a secure connection with the corporate network (not shown). For example, this may be done through a virtual private network or other secure connection to an enterprise server of the first content provider 330. The enterprise server may manage policies for first domain 304 in the example.

The second domain 306 may be associated with a personal domain and mode, and thus may include a portion of memory segregated for personal applications 316 and data 324. The personal applications 316 and data 324 may be considered outside of, or separate from, an information technology policy associated with the first domain 304. The second domain 306 may communicate with a second content provider 332.

The third domain 308 may be associated with a shared mode. For example, the third domain 308 may include information available to a number of different users, such as a husband and wife or co-workers. Any number of different users may access and utilize the third domain 308. The third domain 308 may communicate with the third content provider 334.

The hybrid domain 310 may represent a domain that may encompass multiple domains, applications or data. In one embodiment, the hybrid domain 310 may represent the first domain 304 and the second domain 306. In another embodiment, the hybrid domain 310 may represent all of the domains 312. The hybrid domain 310 may also access content providers 336. The content providers 336 may also represent all or a portion of the content providers 330, 332, 334, 336, such as the first content provider 330 and the second content provider 332. The applications 320 and data 328 may similarly represent applications and data that are available from the other domains 312 or unique applications and data.

Other domains may be associated with different levels of corporate data, where certain data is considered more sensitive and thus the domain for this data may have a policy for passwords and inactivity timeouts that is more secure than other domains. Other domains could be associated with a bridge or connection to a device trusted by a corporate IT policy. Other examples of domains are possible. Similarly, in the second domain 306, the applications 316 may communicate with the data 324. The second domain 306 may also communicate with content provider 330 to retrieve content associated with the second domain 306. For example, the second domain 306 may represent a Google account of the user including email, calendars, contacts, documents, and other accessible information. Thus, the content of the second domain 306 may be stored locally in the second domain 306 of the memory 300 or accessible through the second domain 306. Likewise, the applications 316 and the data 324 may be locally stored or remotely accessed as needed.

By segregating the various applications from others and data associated with each in the domains 312, user preferences and information technology policies may be implemented on the device for certain data, thereby protecting the data, while still allowing for flexibility for other applications and data.

The unified provider 302 manages the policies associated with each domain. The unified provider 302 may provide a unified view across the domains 312. For example, the unified provider 302 is configured to perform queries across the domains 312. In one embodiment, the unified provider 302 may be configured to query the domains 312 based on a query or search request. The related content may be aggregated by the unified provider 302 for display to a user. In one embodiment, the unified provider 302 may utilize a password, pin, or other identifier to authenticate a search of the domains 312. In addition, inactivity timers may be utilize to lock out the query feature of the unified provider 302, such as five minutes after a pin to utilize the query feature has been provided.

The unified provider 302 may utilize a personal information manager (PIM) to retrieve information utilizing any number of attributes and uniform resource identifiers (URIs) for identifying the resources of the domains 312. The unified provider 302 may aggregate the search results in memory in real-time. For example, the unified provider 302 may retrieve data relevant to the search request through the LIST URI supported by a query process for the domains 312. In one embodiment, the content providers 330, 332, 334, 336 may publish a logical mapping and definition of the data that is returned based on the query. A database cursor may be utilized to iterate over and use the search result set. The database cursor is a control structure that enables the traversal over the records in a database, such as those included in the domains 312. For example, the database cursor may utilize mapping of table columns to logical columns as needed to compile the relevant results from the query. In one embodiment, the database cursor may load the search results in a list that may be utilized to generate the unified view for the user. The list may be iteratively updated as distinct queries for each domain 312 are updated.

In another embodiment, the domains 312 may include databases that are accessed directly by the unified provider 302 to form a logical database in the unified provider 302 for aggregating results. For example, the unified provider 302 may open databases in each of the domains 312 and utilize database calls to attach the databases of the domains 312 into one logical database (e.g., formation of a logical database and aggregation utilizing a relational database management system in a small C programming library). Any number of database engines and management systems may be utilized in the domains 312 and by the unified provider 302 to retrieve and store information. The domains 312 may interface with the respective content providers 330, 332, 334, 336 utilizing an interface. Each of the content providers 330, 332, 334, 336 may be identified by an authority string, such as a name element that matches a package.

In one embodiment, to access, utilize, or change the data associated with the applications 314, 316, 318, 320 of the domains 312, the user may be requested to actively select to enter the selected domain (e.g., provide a username and password, may an active selection or input on the device, etc.). As a result, the unified provider 302 may present information associated with the domains 312 as aggregated search results, but copying, editing, forwarding, or otherwise manipulating the associated content may be performed through the respective domains 312 to ensure that the user comply with the applicable security policies and procedures. The data 322, 324, 326, 328 may be encrypted for security. Such encryption and the storing of encryption keys may be managed on the device or externally on a trusted device or server.

Search results performed on the device may have a deletion policy. For example, if the search results are not accessed again within a certain time period, the search results may be wiped out pursuant to a search results deletion timeline. For example, if search results are not accessed on the device for three days, the search results may be deleted from the device. The user would then need to run the search again if it was necessary. This may be implemented through tags or tables associated with the search results.

An operating system on the device may enforce the above differentiating rules between domains. For example, an operating system may implement data access for the various domains 312 among the applications 314, 316, 318, 320 and the data 322, 324, 326, 328. In one embodiment, the unified provider 302 may identify the user utilizing a device with only specified users being able to search the domains 312. User preferences or other policy may specify the specific domains 312 that may be accessed by each user.

In one embodiment, the hybrid domain 310 may be configured for searching across the domains 312. For example, the hybrid domain 310 may include comprehensive access to the first domain 304, the second domain 306, and the third domain 308. As a result, to perform a search of all of the domains 312, the search is initiated through the hybrid domain 310.

In another embodiment, the unified provider 302 may have storage for storing related content returned from the domains 312 based on the query. For example, the unified provider 302 may open the domain level databases directly utilizing database access and calls to form a logical database. The unified provider 302 may then query and aggregate the results using a DBMS. As a result, the unified provider 302 may utilize a number of lists for the database data from each domain 312.

FIG. 4 is an illustration showing an example of search across a domain 400 in accordance with an embodiment of the present disclosure. In one embodiment, a domain 400 may include a unified provider 402 and domain providers 404. Searches of the domain 400 may occur automatically based on a request from an application or based on user input. The domain providers 404 may include any number of accounts or content providers 403, including, for example, social 406, contacts 408, calendar 410, messenger 412, and messages 414. In some embodiments, the content providers 403 may be accessed directly or through one or more networks (e.g., wireless, wired, proprietary, public, cloud, etc.).

In one embodiment, the unified provider 402 may include a list 420. In another embodiment, different types of groupings may be utilized to store data items retrieved from the query. The list 420 may receive information from a list URI 422 associated with the domain providers 404 and list URIs 426, 428, 430, 432 of each of the account content providers 403. For example, the content providers 403 may return data relevant to the query that is included in the list 420. The list 420 may be utilized to display the unified data to the user. Additional queries may be implemented based on the original query to obtain even more relevant results.

For each domain, the unified provider 402 may query each of the content providers 403 to form a result set that is aggregated in the list 420.

Figure 5:
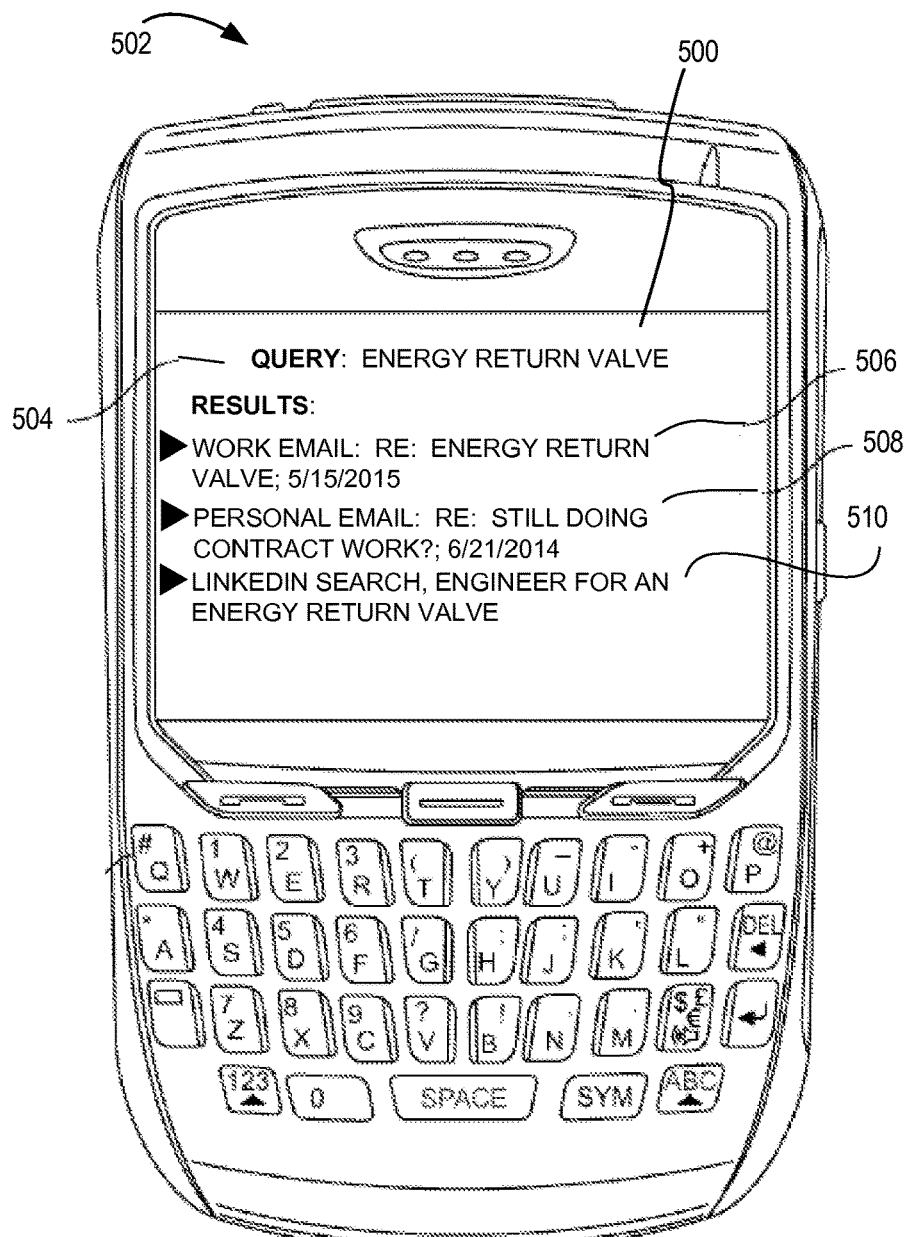
FIG. 5 is an example user interface for performing a search across domains in accordance with an embodiment of the present disclosure.

FIG. 5, shown an example user interface 500 for performing a search across domains in accordance with an embodiment of the present disclosure. In one embodiment, the user interface 500 is displayed to a device 502. The device 502 may represent any number of computing or communication devices produced and provided by manufacturers and service providers. For example, the device 502 may represent devices manufactured by any number of devices and may execute any number of operating systems. The user interface 500 may be representative of a search dialog function or search widget implemented on the device 502. In one embodiment, the user interface 500 may be an integrated portion of an application.

The user interface 500 may be configured to display the results of a query. In one embodiment, the query may be automatically received and initiated from any number of applications utilized by the device 502. In another embodiment, the user interface 500 may be configured to receive the query 504 based on a user selection. The query 504 may be initiated based on selection of a specified button (hard button or soft button), icon, performing a gesture (e.g., performing a swiping motion), or so forth. The query 504 allows the user to query the domains of the device 502 to retrieve information and data relevant to the query 504.

In one embodiment, the search results 506, 508, 510 may be presented for a user to review (e.g., a cursor adapter loaded in a list). The search results 506, 508, 510 may identify a domain, application, identifying information or record title if available (e.g., email subject line, document name, identity. In one embodiment, to further access records or more detailed information associated with the search results 506, 508, 510 the user may access the applicable domain through the operating system to prevent circumvention of the applicable security policies, user preferences, and so forth.

In other embodiments, the user may be able to select domains to include in a query. The user may also specify default domains to include in domains and domains that are not to be included in queries (if any). The user may also be able to limit specific types of data that may be queried in general or across domains.

The example sequence of operations described above are but one possible example of many possible sequences. Many other sequences are possible, with different operations and different ordering of operations. The embodiments are not limited to any particular ordering of operations.

As will be appreciated by one skilled in the art, aspects of the present disclosure may be embodied as a system, method, or computer program product. Accordingly, aspects of the present disclosure may take the form of an entirely hardware embodiment, a software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more non-transitory computer readable medium(s) may be utilized. Non-transitory computer-readable media comprise all computer-readable media, with the sole exception being a transitory, propagating signal. The non-transitory computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 6:
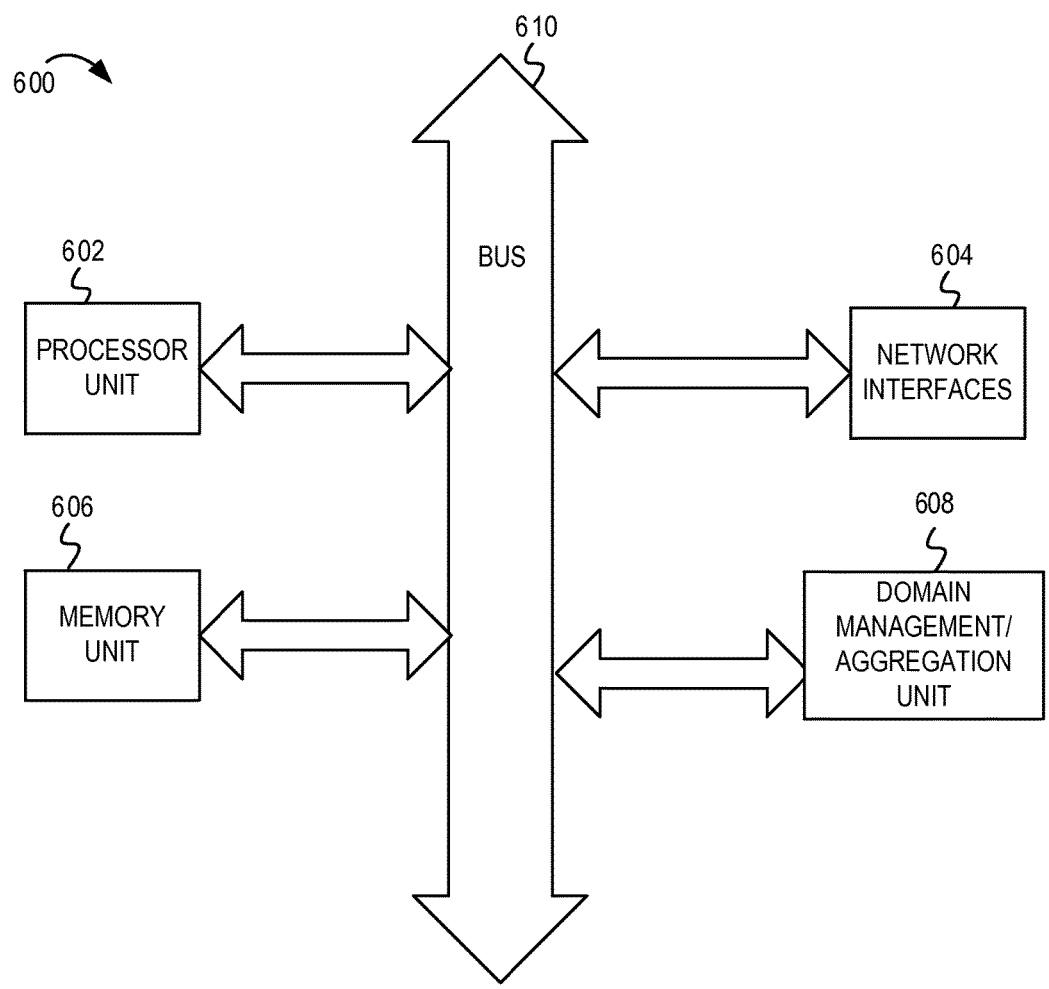
FIG. 6 is a diagram illustrating an example device in which data is aggregated from among domains in accordance with an embodiment of the present disclosure.

FIG. 6 is an example block diagram of one embodiment of an electronic device 600 capable of implementing various embodiments in accordance with this disclosure. The electronic device 600 includes a processor unit 602 (possibly including multiple processors, multiple cores, multiple nodes, and/or implementing multi-threading, etc.). The electronic device 600 includes a memory unit 606. The memory unit 606 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. Those skilled in the art will appreciate that the operating system, domains (e.g. as described in the foregoing figures), or parts thereof, may be temporarily loaded into a volatile store such as memory unit 606. The electronic device 600 also includes a bus 610 (e.g., PCI, ISA, PCI-Express, HyperTransport®, InfiniBand®, NuBus, AHB, AXI, etc.), and network interfaces 604 that include at least one of a wireless network interface (e.g., a WLAN interface, a Bluetooth® interface, a WiMAX interface, a ZigBee® interface, a Wireless USB interface, etc.) and a wired network interface (e.g., a powerline communication interface, an Ethernet interface, etc.).

The electronic device 600 may include a domain management/aggregation unit 608. The domain management/aggregation unit 608 may implement various embodiments described in the foregoing figures. For example, the domain management/aggregation unit 608 may implement the features of unified provider 110, 302, 402. The domain management/aggregation unit 608 may perform some or all of the operations of flowchart 200 (FIG. 2).

Any one of these functionalities may be partially (or entirely) implemented in hardware and/or on the processor unit 602. For example, the functionality may be implemented with an application specific integrated circuit, in logic implemented in the processor unit 602, in a coprocessor on a peripheral device or card, etc. Further, realizations may include fewer or additional components not illustrated in FIG. 6 (e.g., video cards, audio cards, additional network interfaces, peripheral devices, etc.). The processor unit 602, the memory unit 606, and the network interfaces 604 are coupled to the bus 610. Although illustrated as being coupled to the bus 610, the memory unit 606 may be coupled to the processor unit 602.

While the embodiments are described with reference to various implementations and exploitations, it will be understood that these embodiments are illustrative and that the scope of the illustrative embodiments are not limited to them. In general, techniques for aggregating content from among domains as described herein may be implemented with facilities consistent with any hardware system(s). Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the illustrative and potential embodiments. In general, structures and functionality presented as separate components in the example configurations may be implemented as a combined structure or component. Similarly, structures and functionality presented as a single component may be implemented as separate components. These and other variations, modifications, additions, and improvements may fall within the scope of the illustrative and potential embodiments.

What is claimed is:

1. A method for aggregating content from more than one domain of a device, each domain representing a logical collection of resources separate from another domain, the method comprising:
generating a query on the device, wherein the query comprises a search term or phrase provided by a user of the device;
determining available domains on the device responsive to generating the query, the available domains comprising:
a first domain accessible by a first user account of the user; and
a second domain accessible by a second user account of the user;
scanning the available domains based on the query, the first user account, and the second user account to obtain related content from the available domains;
aggregating the related content from the available domains based on priorities associated with the available domains, the priorities being specified by the user;
presenting the aggregated related content to the user of the device such that content obtained from available domains having higher priorities is presented to the user prior to content obtained from available domains having lower priorities, wherein the aggregated related content from the available domains comprises content related to the search term or phrase, wherein presenting the aggregated related content comprises presenting each of the available domains from which related content was obtained, and wherein the available domains include two or more applications including at least two of email, contacts, and calendars; and
deleting the aggregated related content from the device when the aggregated related content is not accessed within a time period.

2. The method of claim 1, wherein the one or more domains represent at least a business domain, a personal domain, and a hybrid domain, the hybrid domain comprising enterprise data and personal data of the business domain and personal domain, respectively, wherein determining available domains comprises determining that the business domain is unavailable unless:
a secure connection is established between the device and an enterprise server that manages the enterprise data; and
a password is provided by the user to authenticate scanning the business domain.

3. The method of claim 1, wherein the device is a mobile wireless device that accesses the available domains and one or more content providers associated with the available domains to generate the related content, the available domains each including a different policy that limits the type of data that may be queried when the mobile wireless device accesses each respective available domain.

4. The method of claim 1, wherein the query is generated by a unified provider in response to the user selecting the search term or phrase from an application in one of the domains, the application including one of email, Short Message Service (SMS), or Multimedia Messaging Service (MMS).

5. The method of claim 1, wherein said scanning further comprises:

scanning, in each of the available domains, data related to the search term or phrase in response to determining the available domains on the device.

6. The method of claim 1, wherein the aggregated related content is included in a list aggregated by a unified provider, wherein the list identifies each available domain corresponding to related content included in the list, and wherein the aggregated related content is presented utilizing a user interface without granting access to data of the aggregated related content retrieved from the available domains.

7. The method of claim 1, wherein the related content is aggregated by a database cursor at runtime to present the aggregated related content in real-time, wherein the database cursor utilizes a mapping of table columns to logical columns to aggregate the related content.

8. The method of claim 1, wherein the available domains include namespaces associated with content providers, and wherein the content providers are scanned directly or through one or more networks to generate the related content.

9. A device comprising:
a memory storing a plurality of domains including data and applications, each of the plurality of domains representing a logical collection of resources separate from other domains, wherein the plurality of domains comprises:
a first domain accessible by a first user account of the user; and
a second domain accessible by a second user account of the user; and
one or more processors in communication with the memory configured to:
generate a query on the device, wherein the query comprises a search term or phrase provided by a user of the device;
responsive to the query, scan the plurality of domains based on the query, the first user account, and the second user account to obtain related content from the plurality of domains;
aggregate the related content from the plurality of domains based on priorities associated with the available domains, the priorities being specified by the user;
present the aggregated related content to the user of the device such that content obtained from available domains having higher priorities is presented to the user prior to content obtained from available domains having lower priorities, wherein the aggregated related content from the plurality of domains comprises content related to the search term or phrase, wherein presenting the aggregated related content comprises presenting each of the available domains from which related content was obtained, and wherein the available domains include two or more applications including at least two of email, contacts, and calendars; and
delete the aggregated related content from the device when the aggregated related content is not accessed within a time period.

10. The device of claim 9, wherein the plurality of domains represent at least a business domain, a personal domain, and a hybrid domain, the hybrid domain comprising enterprise data and personal data of the business domain and personal domain, respectively, wherein the business domain is determined to be unavailable unless:

a secure connection is established between the device and an enterprise server that manages the enterprise data; and
a password is provided by the user to authenticate scanning the secure domain.

11. The device of claim 9, wherein the device is a wireless device comprising a synchronization adapter module (SAM) in more than one domain on the device, and wherein the SAMs communicate with one or more content providers associated with the plurality of domains to synchronize data between the device and the one or more content providers.

12. The device of claim 9, wherein the plurality of domains include namespaces associated with content providers, and wherein the content providers are scanned directly or through one or more networks to aggregate the related content in real-time.

13. The device of claim 9, wherein the aggregated related content is presented utilizing a user interface without granting direct access to data of the aggregated related content retrieved from the plurality of domains.

14. A non-transitory computer-readable medium comprising computer readable instructions for a device having a plurality of domains, each of the plurality of domains representing a logical collection of resources separate from other domains, the instructions for causing one or more processors of the device to perform operations comprising:
generating a query on the device, wherein the query comprises a search term or phrase provided by a user of the device;
determining available domains on the device responsive to generating the query, the available domains comprising:
a first domain accessible by a first user account of the user; and
a second domain accessible by a second user account of the user;
scanning the available domains based on the query, the first account, and the second account to obtain related content from the available domains;
aggregating the related content from the available domains based on priorities associated with the available domains, the priorities being specified by the user;
presenting the aggregated related content to the user of the device such that content obtained from available domains having higher priorities is presented to the user prior to content obtained from available domains having lower priorities, wherein the aggregated related content from the available domains comprises content related to the search term or phrase, wherein presenting the aggregated related content comprises presenting each of the available domains from which related content was obtained, and wherein the available domains include two or more applications including at least two of email, contacts, and calendars; and
deleting the aggregated related content from the device when the aggregated related content is not accessed within a time period.

15. The non-transitory computer-readable medium of claim 14, wherein the available domains include namespaces associated with content providers, and wherein the content providers are scanned directly or through one or more networks to aggregate the related content.

16. The non-transitory computer-readable medium of claim 14, wherein the query is generated by a unified provider in response to the user selecting the search term or phrase from an application in one of the domains, the application including one of email, Short Message Service (SMS), or Multimedia Messaging Service (MMS).

17. The non-transitory computer-readable medium of claim 14, wherein the aggregated related content is presented utilizing a user interface without granting direct access to data of the aggregated related content retrieved from the available domains.

18. The non-transitory computer-readable medium of claim 14, wherein the related content is aggregated by a database cursor at runtime to present the aggregated related content in real-time, wherein the database cursor utilizes a mapping of table columns to logical columns to aggregate the related content.

19. The non-transitory computer-readable medium of claim 14, wherein said scanning further comprises:
   scanning a plurality of applications and data in the available domains utilizing a unified provider.

\* \* \* \* \*